US008442448B2

(12) United States Patent
Kim et al.

(10) Patent No.: US 8,442,448 B2
(45) Date of Patent: May 14, 2013

(54) APPARATUS AND METHOD FOR TRANSMITTING/RECEIVING DATA IN A CLOSED-LOOP MULTI-ANTENNA SYSTEM

(75) Inventors: Sung-Jin Kim, Suwon-si (KR); Yong-Xing Zhou, Yongin-si (KR); Ho-Jin Kim, Seoul (KR); Jung-Hoon Suh, Yongin-si (KR); Chang-Soon Park, Chungju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 11/772,325

(22) Filed: Jul. 2, 2007

(65) Prior Publication Data

US 2008/0125051 A1     May 29, 2008

(30) Foreign Application Priority Data

Jun. 30, 2006    (KR) .................. 10-2006-0061434

(51) Int. Cl.
 *H04B 1/00*    (2006.01)
(52) U.S. Cl.
 USPC .......................................... 455/69
(58) Field of Classification Search ............ 455/69
 See application file for complete search history.

(56) References Cited

U.S. PATENT DOCUMENTS

| 7,050,759 | B2 | 5/2006 | Gaal et al. | |
| 7,120,199 | B2 * | 10/2006 | Thielecke et al. | 375/267 |
| 7,480,341 | B2 | 1/2009 | Jeong et al. | |
| 7,593,486 | B2 | 9/2009 | Jeong et al. | |
| 8,094,571 | B2 | 1/2012 | Gaal et al. | |
| 2004/0067757 | A1 * | 4/2004 | Fukui | 455/453 |
| 2004/0136349 | A1 * | 7/2004 | Walton et al. | 370/338 |
| 2004/0203465 | A1 * | 10/2004 | Goldstein et al. | 455/67.13 |
| 2004/0247088 | A1 | 12/2004 | Lee et al. | |
| 2005/0031044 | A1 | 2/2005 | Gesbert et al. | |
| 2005/0128993 | A1 * | 6/2005 | Yu et al. | 370/342 |
| 2006/0159120 | A1 * | 7/2006 | Kim | 370/465 |
| 2006/0205357 | A1 * | 9/2006 | Kim | 455/69 |
| 2007/0258366 | A1 | 11/2007 | Imamura | |
| 2008/0227395 | A1 * | 9/2008 | Kim et al. | 455/62 |

(Continued)

FOREIGN PATENT DOCUMENTS

| EP | 1458118 | 9/2004 |
| JP | 2007-251924 A | 9/2007 |

(Continued)

OTHER PUBLICATIONS

PCT International Search Report and Written Opinion issued in corresponding PCT International Application No. PCT/KR2007/003195 dated Oct. 12, 2007.

(Continued)

*Primary Examiner* — Zhiyu Lu
*Assistant Examiner* — David Bilodeau
(74) *Attorney, Agent, or Firm* — NSIP Law

(57) ABSTRACT

An apparatus and method for transmitting and/or receiving data in a closed-loop multi-antenna system, the method of receiving data including: acquiring CQIs of data streams by channel estimation of a received signal; selecting at least one CQI from among the acquired CQIs; calculating a common CQI using the acquired CQIs; generating feedback information with the at least one CQI, the common CQI, and an index of a data stream with the at least one CQI; and transmitting the feedback information to a transmitter.

40 Claims, 8 Drawing Sheets

U.S. PATENT DOCUMENTS

| | | | |
|---|---|---|---|
| 2008/0233989 A1* | 9/2008 | Kim et al. | 455/517 |
| 2009/0291702 A1 | 11/2009 | Imai et al. | |
| 2010/0232367 A1* | 9/2010 | Fukui | 370/329 |
| 2011/0176595 A1 | 7/2011 | Duan et al. | |

FOREIGN PATENT DOCUMENTS

| | | |
|---|---|---|
| JP | 2008-502277 A | 1/2008 |
| JP | 2009-530899 A | 8/2009 |
| KR | 10-2003-0093346 A | 12/2003 |
| KR | 10-2004-0078166 A | 9/2004 |
| KR | 10-2006-0034542 A | 4/2006 |
| KR | 10-2006-0046429 A | 5/2006 |
| WO | WO 2004/102829 A1 | 11/2004 |
| WO | WO 2006/059566 A1 | 6/2006 |
| WO | WO 2007/111266 A1 | 10/2007 |
| WO | WO 2007/122727 A1 | 11/2007 |

OTHER PUBLICATIONS

Japanese Office Action issued Nov. 8, 2011, in counterpart Japanese Application No. 2009-517988 (2pp).

Korean Notification of the Reasons for Rejection mailed Aug. 27, 2012, issued in counterpart Korean Patent Application No. 10-2006-0061434; 7 pages including English translation.

* cited by examiner

APPARATUS AND METHOD FOR TRANSMITTING/RECEIVING DATA IN A CLOSED-LOOP MULTI-ANTENNA SYSTEM

CROSS-REFERENCE TO RELATED APPLICATIONS

This application claims the benefit of a Korean Patent Application No. 2006-61434 filed in the Korean Intellectual Property Office on Jun. 30, 2006, the disclosure of which is incorporated herein by reference.

BACKGROUND OF THE INVENTION

1. Field of the Invention

Aspects of the present invention generally relate to a closed-loop multi-antenna system, and more particularly, to an apparatus and method for transmitting and/or receiving data in a closed-loop multi-antenna system.

2. Description of the Related Art

Compared to a wired channel, a wireless channel environment generally has low reliability due to multipath interference, shadowing, propagation attenuation, time-variant noise, and interference. As a result, an increase of data transmission rates in mobile communications has been impeded.

A Multiple Input Multiple Output (MIMO) system has been proposed to avert the aforementioned problems. A MIMO system is an example of a multi-antenna system. Multi-antenna systems support a single-user mode and a-multi-user mode. In the single-user mode, data is transmitted to one user through a plurality of transmit antennas. In contrast, in the multi-user mode, data is transmitted to a plurality of users through the transmit antennas.

The multi-antenna systems are also categorized as closed-loop systems relying on feedback information for resource allocation and open-loop systems that do not use feedback information for resource allocation. Efficient resource allocation with minimal feedback information is a critical task of a closed-loop multi-antenna system. In particular, when multiple users are supported, decreasing the amount of feedback information is more significant.

Meanwhile, due to a diversification of wireless communication services, there is a high probability that mobile stations (MSs) or terminals with different characteristics co-exist in the same service area. Hence, a base station (BS) should be able to support different communication schemes. For example, the BS should be able to support both the single-user mode and the multi-user mode. The BS should also be able to support both types of MSs using linear signal detection and non-linear signal detection.

SUMMARY OF THE INVENTION

Aspects of the present invention provide a data reception apparatus and method for minimizing feedback information in a closed-loop multi-antenna system supporting multiple users, and an apparatus and method for transmitting data based on reduced feedback information in a closed-loop multi-antenna system supporting multiple users.

Aspects of the present invention also provide a data transmission apparatus and method for selectively supporting a single-user mode or a multi-user mode in a closed-loop multi-antenna system.

Aspect of the present invention also provide a data reception apparatus and method for generating and transmitting feedback information so as to selectively support a single-user mode or a multi-user mode in a closed-loop multi-antenna system.

Aspects of the present invention also provide a transmission apparatus and method for operating adaptively according to a signal detection scheme used in a receiver in a closed-loop multi-antenna system.

According to an aspect of the present invention, there is provided a method of receiving data in a closed-loop multi-antenna system, the method including: acquiring CQIs of data streams from a received signal; selecting at least one CQI from among the acquired CQIs; calculating a common CQI using the acquired CQIs; generating feedback information with the at least one CQI, the common CQI, and an identifier of a data stream with the at least one CQI; and transmitting the feedback information to a transmitter.

According to another aspect of the present invention, there is provided an apparatus for receiving data in a closed-loop multi-antenna system, the apparatus including: a channel estimator to acquire CQIs of data streams from a received signal; and a feedback information generator to select at least one CQI from among the acquired CQIs, to calculate a common CQI using the acquired CQIs, to generate feedback information with the at least one CQI, the common CQI, and an identifier of a data stream with the at least one CQI, and to transmit the feedback information to a transmitter.

According to another aspect of the present invention, there is provided a method of transmitting data in a closed-loop multi-antenna system, the method including: receiving feedback information from at least one receiver, the feedback information including a best CQI, a common CQI, and an index of a data stream with the best CQI; determining an operation mode according to the feedback information; and transmitting one or more data streams in the determined operation mode.

According to yet another aspect of the present invention, there is provided an apparatus for transmitting data in a closed-loop multi-antenna system, the apparatus including: a controller to receive feedback information from at least one receiver, the feedback information including a best CQI, a common CQI, and an index of a data stream with the best CQI, and to determine an operation mode according to the feedback information; and a signal transmitter to transmit one or more data streams in the determined operation mode.

According to still another aspect of the present invention, there is provided a closed-loop multi-antenna system including: one or more receivers to receive data, each receiver including: a channel estimator to acquire Channel Quality Information (CQIs) of data streams from a received signal; and a feedback information generator to select at least one CQI from among the acquired CQIs, to calculate a common CQI using the acquired CQIs, to generate feedback information comprising the at least one CQI, the common CQI, and an identifier of a data stream with the at least one CQI, and to transmit the feedback information to a transmitter; and a transmitter to transmit the data, the transmitter including: a controller to receive the feedback information from the one or more receivers, the feedback information, and to determine an operation mode according to the feedback information; and a signal transmitter to transmit one or more data streams in the determined operation mode.

According to another aspect of the present invention, there is provided a method of transmitting and receiving data in a closed-loop multi-antenna system, the method including: acquiring, in one or more receivers, Channel Quality Information (CQIs) of data streams from a received signal; selecting at least one CQI from among the acquired CQIs; calculating a common CQI using the acquired CQIs; generating feedback information comprising the at least one CQI, the common CQI, and an identifier of a data stream with the at least one CQI; transmitting the feedback information from the one or more receivers to a transmitter; determining an operation mode according to the feedback information; and transmitting, from the transmitter, one or more data streams in the determined operation mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
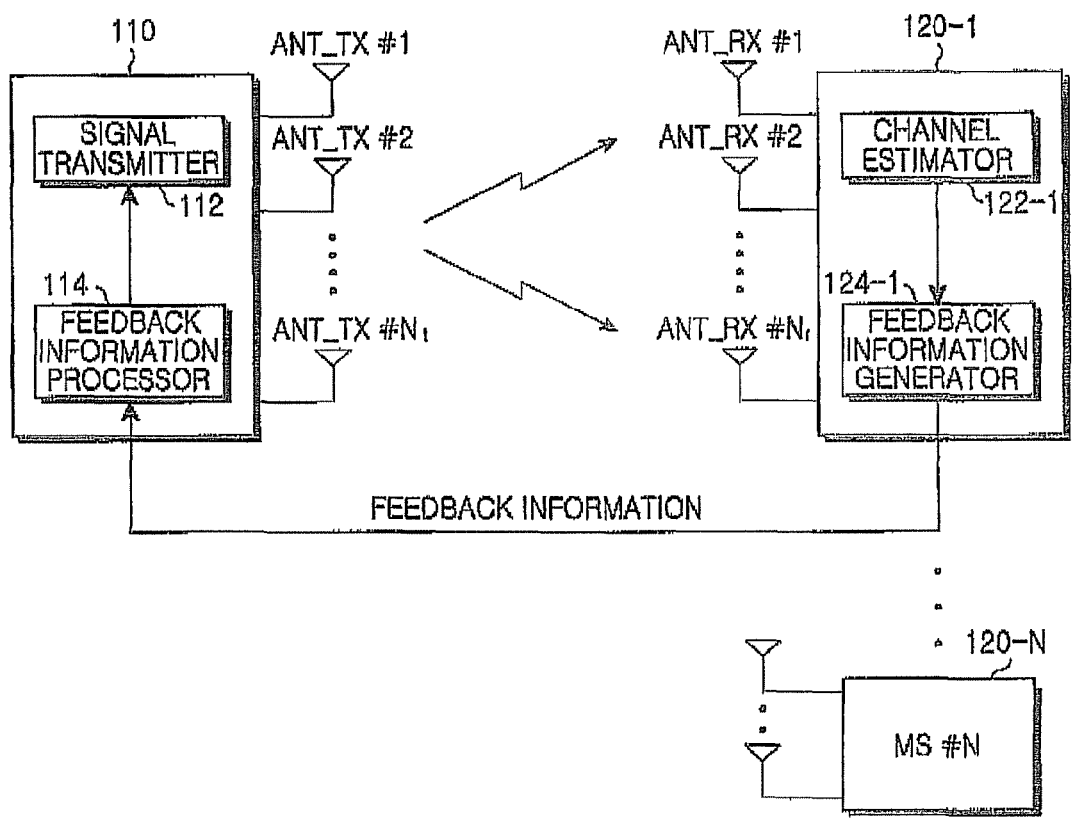
FIG. 1 is a block diagram of a closed-loop multi-antenna system supporting multiple users according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a closed-loop multi-antenna system supporting multiple users according to an embodiment of the present invention. In FIG. 1, the closed-loop multi-antenna system includes a transmitter 110 and a plurality of receivers 120-1 to 120-N. The transmitter 110 can be a base station (BS) and the receivers 120-1 to 120-N can be mobile stations (MSs) or terminals, such as mobile phones or personal digital assistants. It is noted that although the following description focuses on one receiver 120-1, it is understood that aspects of the present invention may be applied to a plurality of receivers 120-1 to 120-N, which may exhibit the same characteristics as the one receiver 120-1 to be described.

Referring to FIG. 1, the receiver 120-1 performs channel estimation on a received signal and acquires Channel Quality Information (CQI) values of data streams from the channel estimation. For simplicity, the CQI values will be referred to as CQIs in the following descriptions. The data streams can be defined differently depending on whether the transmitter 110 uses a precoder.

The receiver 120-1 generates feedback information based on the CQIs of the data streams. The feedback information is generated according to a used signal detection scheme, use or non-use of a precoder in the transmitter 110, and the like. The receiver 120-1 transmits the feedback information to the transmitter 110.

The transmitter 110 receives the feedback information from all of the receivers 120-1 to 120-N and selects at least one user (i.e., receiver) based on the feedback information. The number of selected users is determined according to an operation mode, which can be a single-user mode or a multi-user mode. One user is selected in the single-user mode and a plurality of users are selected in the multi-user mode. The operation mode may be determined according to the feedback information. However, it is understood that according to other aspects, a user or a terminal manager (such as a base station network manager) may manually set the operation mode.

The transmitter 110 selects a Modulation and Coding Scheme (MCS) level based on the feedback information. However, it is understood that the transmitter can select the MCS level based on other factors, such as the signal detection scheme of the receiver, the operation mode, and the number of data streams to be transmitted to the user. The transmitter 110 encodes and modulates data streams in a coding and modulation scheme corresponding to the MCS level and transmits the modulated data streams to the at least one selected user.

Accordingly, the transmitter 110 determines an operation mode based on feedback information received from the receivers 120-1 to 120-N. That is, the transmitter 110 can selectively use the single-user mode or the multi-user mode.

To operate in the above-described manner, the receiver 120-1 includes at least one receive antenna Ant_rx #1 to Ant_rx #$N_r$, a channel estimator 122-1, and a feedback information generator 124-1. Furthermore, the transmitter 110 includes a plurality of transmit antennas ANT_tx #1 to Ant tx #$N_t$, a feedback information processor 114, and a signal transmitter 112.

In the receiver 120-1, the channel estimator 122-1 estimates the CQIs of data streams from a signal received through the at least one receive antenna Ant_rx #1 to Ant_rx #N by a predetermined signal detection scheme (for example, a linear detection scheme or a non-linear detection scheme). An example of a linear signal detection scheme is a Linear Minimum Mean Squared Error (LMMSE) scheme and an example of a non-linear detection scheme is a Successive Interference Cancellation (SIC) scheme. It is understood that although aspects of the present invention will be described in the context of LMMSE and SIC, aspects of the present invention are not limited thereto. The signal detection scheme may be preset for the channel estimator 122-1. However, if a dual mode is supported, the channel estimator 122-1 may select an optimal signal detection scheme considering a channel status.

The feedback information generator 124-1 generates feedback information using the CQIs of the data streams received from the channel estimator 122-1, taking into account the signal detection scheme of the channel estimator 122-1. The feedback information includes the best CQI ($CQI_{max}$), an identifier (such as the index) of a data stream offering $CQI_{max}$ (Layer_Index$_{max}$), and a common CQI ($CQI_{remaining}$). $CQI_{max}$ is the highest of the CQIs of the data streams, Layer_index$_{max}$ is the index of a data stream (or layer) with $CQI_{max}$, and $CQI_{remaining}$ is calculated using the CQIs of the remaining layers except the layer with $CQI_{max}$. $CQI_{remaining}$ is different depending on a used signal detection scheme. However, it is understood that according to other aspects, the feedback information may include additional information (such as a second best CQI), or less information.

For LMMSE, $CQI_{remaining}$ is the average of the remaining CQIs, generalized to the following formula:

$$CQI_{remaining} = \frac{1}{N_{stream} - 1} \sum_{m \neq Layer\_Index_{max}} CQI_m \quad \text{Equation (1)}$$

where $N_{stream}$ is the total number of data streams transmitted by the transmitter 110, equal to the number of the CQIs received from the channel estimator 122-1, and $CQI_m$ is the CQI estimate of an $m^{th}$ data stream.

In terms of data rates supported by CQIs, $CQI_{remaining}$ is defined as:

$$\text{Rate}(CQI_{remaining}) = \frac{1}{N_{stream} - 1} \sum_{m \neq Layer\_Index_{max}} \text{Rate}(CQI_m) \quad \text{Equation (2)}$$

Equation (1) and Equation (2) commonly exclude $CQI_{max}$ in calculating $CQI_{remaining}$). Considering $CQI_{max}$, a $CQI_{remaining}$ is given by:

$$CQI_{remaining} = \frac{1}{N_{stream}} \sum_{m=1}^{N_{stream}} CQI_m \quad \text{Equation (3)}$$

For SIC, $CQI_{remaining}$ is the maxim between the lowest remaining CQI and the average of the remaining CQIs, generalized to the following formula:

$$CQI_{remaining} = \quad \text{Equation (4)}$$
$$\max\left\{\min_{m \neq Layer\_Index_{max}}\{CQI_{m,SIC}\}, CQI_{SIC\_linear\_average}\right\}$$

where $CQI_{m,SIC}$ is the CQI estimate of an $m^{th}$ data stream and $CQI_{SIC\_linear\_average}$ is the average of the remaining CIQs except $CQI_{max}$.

$CQI_{SIC\_linear\_average}$ is defined as:

$$CQI_{SIC\_linear\_average} = \quad \text{Equation (5)}$$
$$\frac{1}{N_{stream} - 1} \sum_{m \neq Layer\_Index_{max}} CQI_{m,SIC\_linear}$$

where $N_{stream}$ is the total number of data streams transmitted by the transmitter 110, equal to the number of the CQIs received from the channel estimator 122-1, and $CQI_{m,SIC\_linear}$ is the CQI estimate of an $m^{th}$ data stream other than the data stream with $CQI_{max}$.

Furthermore, the feedback information generator 124-1 may further consider the number of data streams transmitted to the user and use or non-use of a precoder when generating the feedback information. If the transmitter 110 uses a precoder, the feedback information may further include a precoder index, Precoder_Index. The precoder index identifies a precoding matrix that maximizes single user performance in a codebook. When SIC is used as the non-linear detection scheme, the feedback information may further include a coding scheme Identifier (ID) identifying a coding scheme to be used in the transmitter 110. The coding scheme ID can be 1 bit.

The receiver 120-1 transmits the feedback information to the transmitter 110. The feedback information may, although not necessarily, be transmitted periodically. However, if, for example, a transmission time is preset between the transmitter 110 or the receiver 120-1, the feedback information transmission may be non-periodic.

In the transmitter 110, the feedback information processor 114 selects at least one user based on feedback information received from all of the receivers 120-1 to 120-N and determines a coding scheme and an MCS level for transmission of data streams to the at least one selected users. Since the feedback information is defined differently according to signal detection schemes used in the receivers 120-1 to 120-N, the feedback information processor 114 processes the feedback information differently according to the signal detection schemes.

The operation mode of the transmitter 110 may be considered in selecting the at least one user. In such a case, operation mode selection precedes the user selection in the feedback information processor 110. As stated before, the operation mode can be a single-user mode or a multi-user mode.

The operation mode selection may be made by comparing a performance of the single-user mode ($R_{SU}$) with a performance of the multi-user mode ($R_{MU,sum}$). $R_{MU,sum}$ is the sum of maximum performances of multiple users. That is, $R_{MU,sum}$ is the sum of $CQI_{max}$ received from the receivers:

$$R_{MU,sum} = \sum_{m=1}^{4} R_{MU,m} \quad \text{Equation (6)}$$

$R_{MU,m}$ is defined as:

$$R_{MU,m} = \max_{k|k=1,2,\ldots,K}\{\text{Rate}(CQI_{max,k}) | Layer\_Index_{max} = m\} \quad \text{Equation (7)}$$

where $R_{MU,m}$ is a data rate supported by the highest of $CQI_{max,k}$ values with $Layer\_Index_{max}=m$.

The single-user mode performance $R_{SU}$ is calculated by:

$$R_{SU} = \max_{k=1,2,\ldots,K}\{\text{Rate}(CQI_{max,k}) + \quad \text{Equation (8)}$$
$$(N_{stream} - 1) \times \text{Rate}(CQI_{remaining,k})\}$$

where $\text{Rate}(CQI_{max,k})$ is a data rate supported by $CQI_{max}$ received from a $k^{th}$ user, $\text{Rate}(CQI_{remaining,k})$ is a data rate supported by $CQI_{remaining}$ received from the $k^{th}$ user, and $N_{stream}$ is the total number of data streams transmitted by the transmitter 110.

Referring to Equation (8), the feedback information processor 114 calculates a single-user mode data rate for each receiver 120-1 to 120-N. For example, the single-user mode data rate for the $k^{th}$ user is calculated to be the sum of using a data rate supported by $CQI_{max,k}$ and a data rate supported by $CQ_{remainin,k}$ (i.e., $\text{Rate}(CQI_{max,k})+(N_{stream}-1) \times \text{Rate}(CQI_{remaining,k})$). Then, the feedback information processor 114 selects the highest of the single-user mode data rates and selects the user offering the highest single-user mode data rate as a user for which the single-user mode is applied. The selected highest data rate is $R_{SU}$.

If $R_{MU,sum}$ is larger than $R_{SU}$ ($R_{MU,sum} > R_{SU}$), the feedback information processor 114 selects the multi-user mode. If $R_{MU,sum}$ is less than or equal to $R_{SU}$ ($R_{MU,sum} \leq R_{SU}$), the feedback information processor 114 selects the single-user mode.

When the single-user mode is selected, the feedback information processor 114 may select an MCS level and a coding scheme based on the feedback information received from the selected user. However, according to other aspects, the feedback information processor 114 may select the MCS level and the coding scheme based additionally or alternatively on the number of data streams to be transmitted to the user or a requested coding scheme. Specifically, the number of data streams may be further considered when the receiver uses a linear detection scheme (such as LMMSE) and the requested coding scheme may be further considered when the receiver uses a non-linear detection scheme (such as SIC).

In the case where the receiver uses a linear detection scheme and one data stream is transmitted to the receiver, the feedback information processor 114 selects an MCS level that can offer the calculated single-user mode performance $R_{SU}$ and selects a pure vertical coding scheme.

In the case where the receiver uses the linear detection scheme and two data streams are transmitted to the receiver, the feedback information processor 114 selects two MCS levels corresponding to $CQI_{max,k}$ and $CQI_{remainin,k}$, and selects a hybrid vertical/horizontal coding scheme.

In the case where the receiver uses a non-linear detection scheme and requests the pure horizontal coding scheme, the feedback information processor 114 selects two MCS levels corresponding to $R_{SU}$ and $CQI_{max,k}$ and selects the pure horizontal coding scheme.

In the case where the receiver uses the non-linear detection scheme and requests the hybrid vertical/horizontal coding scheme, the feedback information processor 114 selects two MCS levels corresponding to $R_{SU}$ and $CQI_{max,k}$ and selects the hybrid vertical/horizontal coding scheme.

When the multi-user mode is selected, the feedback information processor 114 selects MCS levels for respective users selected for the multi-user mode irrespective of signal detection schemes used in the receivers of the users, and selects a pure horizontal coding scheme.

The signal transmitter 112 transmits a data stream to the at least one selected user (i.e., receiver) using the MCS level and the coding scheme determined by the feedback information processor 114.

Figure 2:
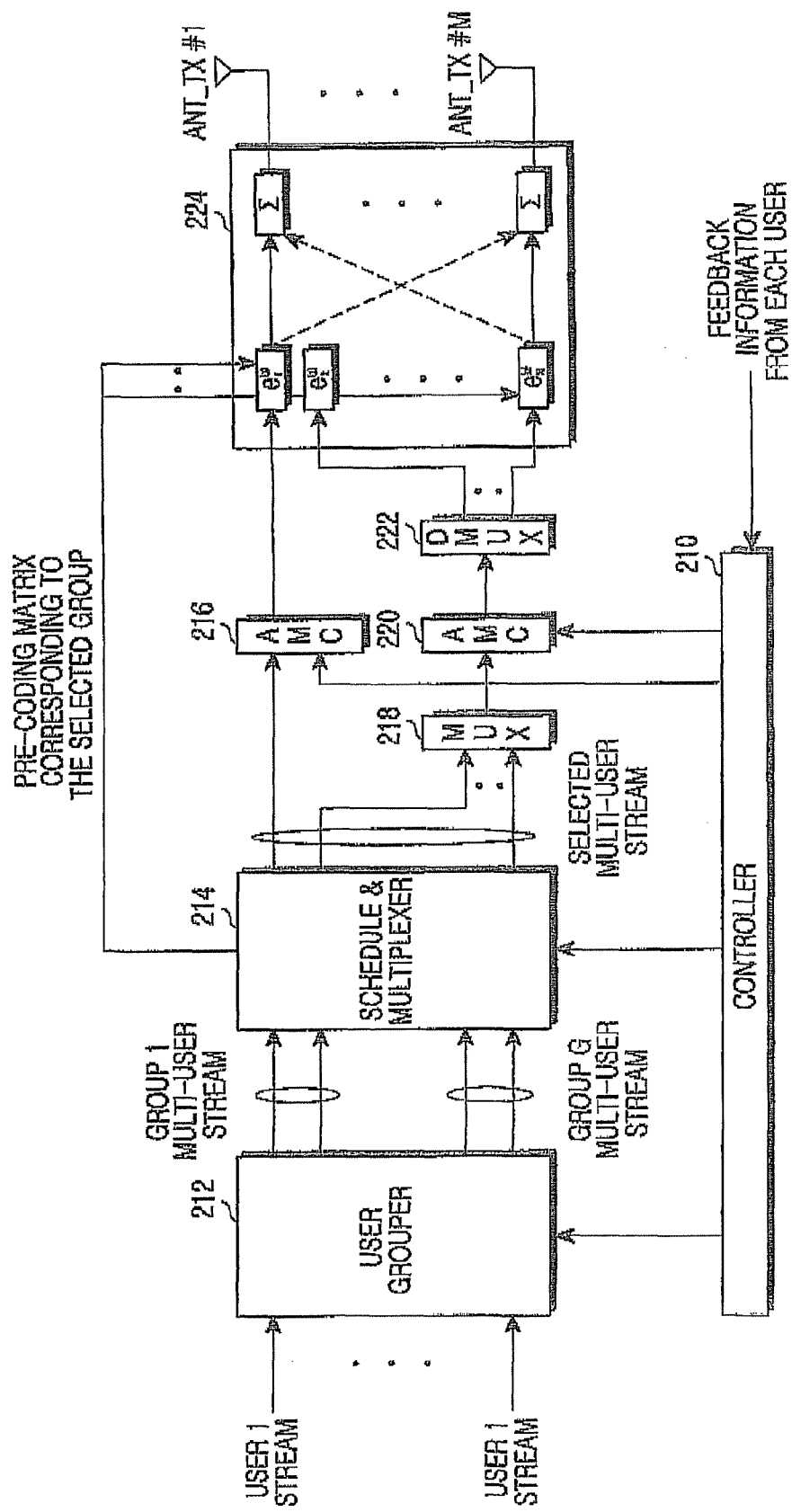
FIG. 2 is a detailed block diagram of a transmitter according to an embodiment of the present invention.

FIG. 2 is a detailed block diagram of a transmitter supporting the single-user mode according to an embodiment of the present invention. To support the multi-user mode as well, the transmitter can be configured so as to perform adaptive modulation and coding for each data stream by use of a switch.

Referring to FIG. 2, a controller 210 receives feedback information from all of the receivers and controls transmission of data streams based on the feedback information. The controller 210 operates in the same manner as the feedback information processor 114 illustrated in FIG. 1, and thus its detailed description is not provided herein.

A user grouper 212 receives data streams for a plurality of users User #1 to User #K and groups the data streams under the control of the controller 210. Accordingly, the user grouper 212 produces a plurality of data stream groups Group 1 to Group G.

A scheduler and multiplexer (MUX) 214 schedules the data stream groups Group 1 to Group G and multiplexes the scheduled multi-user streams under the control of the controller 210. The scheduler and MUX 214 outputs a data stream group selected under the control of the controller 210 through a predetermined output port connected to an Adaptive Modulator and Coder (AMC) 216 for processing the selected data stream group. If the transmitter uses a precoder, the scheduler and MUX 214 outputs a precoding matrix corresponding to the selected data stream group.

A first AMC 216 encodes and modulates the selected data stream group received from the scheduler and MUX 214. If there is one data stream for a selected user, the first AMC 216 is notified of a pure vertical coding scheme and an MCS level determined according to $CQI_{effective}$, as describe above with reference to FIG. 1. If there are two data streams for the selected user, the first AMC 216 is notified of a hybrid vertical/horizontal coding scheme and an MCS level determined according to $CQI_{max}$, as describe above with reference to FIG. 1.

A MUX 218 multiplexes the remaining data stream groups (except the selected data stream group) received from the scheduler and MUX 214, into one data stream group.

A second AMC 220 encodes and modulates the data stream group received from the MUX 218. If there is one data stream for the selected user, the second AMC 220 is notified of the pure vertical coding scheme and the MCS level determined according to $CQI_{effective}$, as describe above with reference to FIG. 1. If there are two data streams for the selected user, the second AMC 216 is notified of the hybrid vertical/horizontal coding scheme and an MCS level determined according to $CQI_{remaining}$, as describe above with reference to FIG. 1. A DEMUX 222 demultiplexes the data stream received from the second AMC 220 to a plurality of data streams.

If the transmitter uses precoding, the data streams from the first AMC 216 and the DEMUX 222 are provided to a precoder 224. If the transmitter does not use precoding, the data streams from the first AMC 216 and the DEMUX 222 are transmitted through predetermined transmit antennas.

The precoder 224 precodes the received data streams using the precoding matrix received from the scheduler and MUX 214 and transmits the precoded data streams through corresponding transmit antennas ANT_TX #1 to ANT_TX #M.

As described above, the transmitter supporting the single-user mode uses two AMCs 216 and 220. One of the AMCs 216 is used for a selected data stream and the other AMC 220 is used for a data stream in which the remaining data streams are multiplexed into one data stream.

Figure 3:
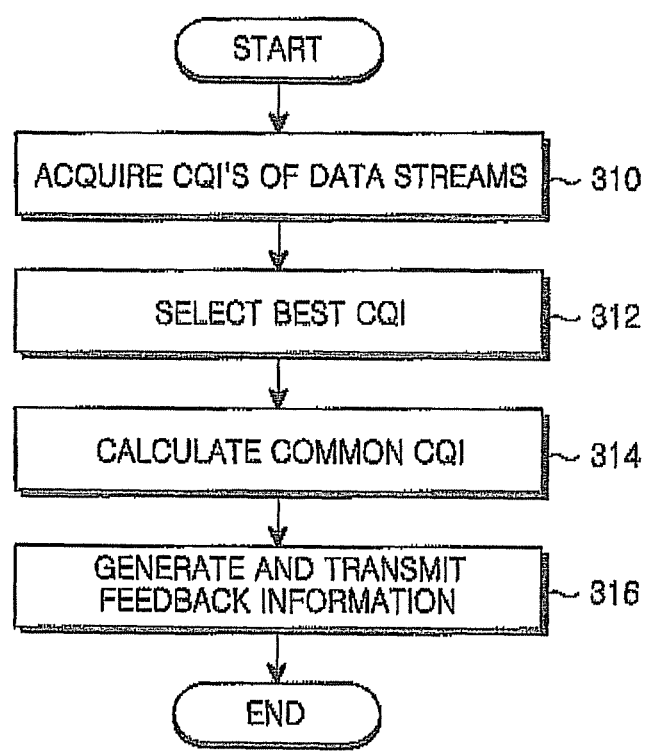
FIG. 3 is a flowchart illustrating a control operation of a receiver in the closed-loop multi-antenna system supporting multiple users according to an embodiment of the present invention.

FIG. 3 is a flowchart illustrating a control operation of a receiver in the closed-loop multi-antenna system supporting multiple users according to an embodiment of the present invention. Referring to FIG. 3, first, the receiver estimates the CQIs of data streams using a received signal according to a predetermined signal detection scheme in operation 310. The signal detection scheme may be a linear signal detection scheme or a non-linear detection scheme.

In operation 312, the receiver selects one or more CQIs from among the estimated CQIs (operation 310) as $CQI_{max}$, and detects the index of a data stream with $CQI_{max}$ (Layer_Index$_{max}$). For example, the receiver may select the best CQI as $CQI_{max}$.

The receiver calculates $CQI_{remaining}$ using the CQIs of the data streams in operation 314. $CQI_{remaining}$ is defined differently depending on the used signal detection scheme. In the case of a linear detection scheme, $CQI_{remaining}$ may be calculated by Equation (1) or Equation (3), describe above with reference to FIG. 1. In the case of a non-linear detection scheme, $CQI_{remaining}$ may be calculated by Equation (4) and Equation (5), describe above with reference to FIG. 1.

In operation 316, the receiver generates feedback information including $CQI_{max}$ (operation 312), Layer_Index$_{max}$ (operation 312), and $CQI_{remaining}$ (operation 314) and transmits the feedback information to the transmitter. It is understood that according to other aspects, the receiver may generate the feedback information to include an identifier of $CQI_{max}$ other then $Layer\_Index_{max}$. If the transmitter uses a precoder, the feedback information may further include Precoder_Index. If a non-linear detection scheme is used, the feedback information may further include a 1-bit coding scheme ID identifying a coding scheme to be used in the transmitter. The coding scheme ID identifies a pure horizontal coding scheme or a hybrid vertical/horizontal coding scheme.

Figure 4:
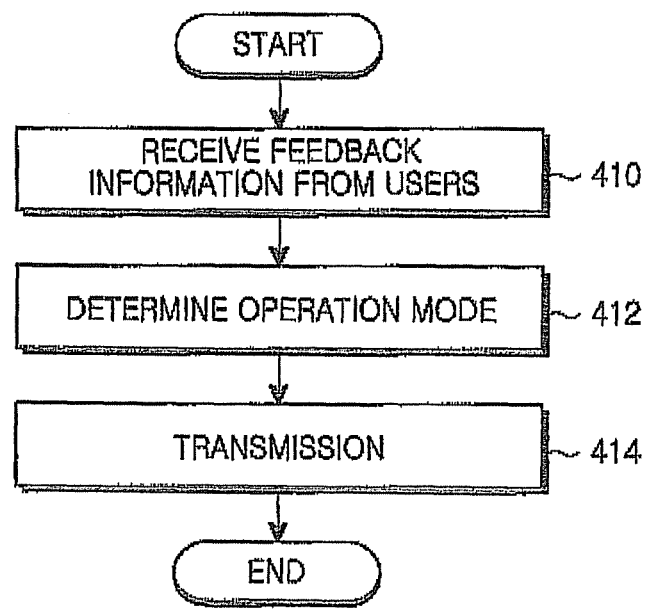
FIG. 4 is a flowchart illustrating a control operation of the transmitter in the closed-loop multi-antenna system supporting multiple users according to an embodiment of the present invention.

FIG. 4 is a flowchart illustrating a control operation of the transmitter in the closed-loop multi-antenna system supporting multiple users according to an embodiment of the present invention. Referring to FIG. 4, first, the transmitter receives feedback information from receivers in operation 410. Then, the transmitter determines an operation mode based on the feedback information in operation 412. The transmitter may determine the operation made in an operation mode selection sub-routine illustrated in FIG. 5.

Figure 5:
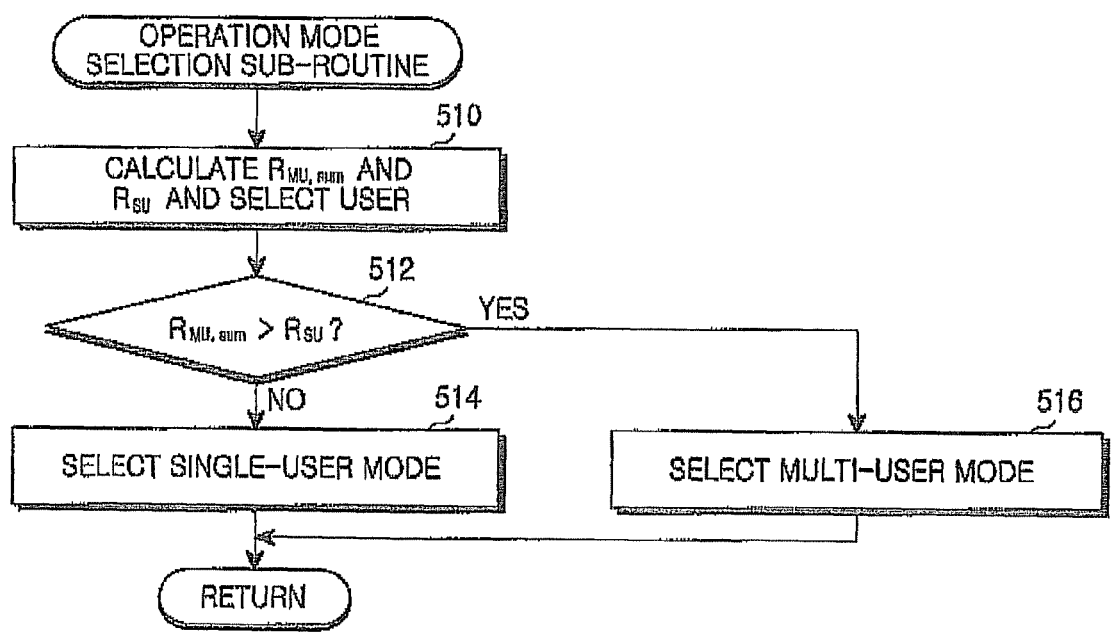
FIG. 5 is a flowchart illustrating a control operation for the operation mode selection sub-routine illustrated in FIG. 4.

Referring to FIG. 5, in the operation mode selection, the transmitter first calculates a single-user mode performance $R_{SU}$ and a multi-user mode performance $R_{MU,sum}$ using the feedback information and selects a user to which a data stream is to be transmitted in operation 510. $R_{MU,sum}$ is the sum of $CQI_{max}$ values received from the receivers. $R_{SU}$ and may be calculated by Equation (6), describe above with reference to FIG. 1.

In operation 512, the transmitter compares $R_{SU}$ with $R_{MU,sum}$. For example, if $R_{MU,sum}$ is larger than $R_{SU}$ ($R_{MU,sum}>R_{SU}$), the transmitter selects multi-user mode in operation 514. If $R_{MU,sum}$ is less than or equal to $R_{SU}$ ($R_{MU,sum} \leq R_{SU}$), the transmitter selects single-user mode in operation 516.

Referring back to FIG. 4, after determining the operation mode, the transmitter transmits the data stream in the determined operation mode according to a transmission sub-routine in operation 414. The transmission sub-routine is illustrated in detail in FIG. 6 or FIG. 7. The transmission sub-routine depicted in FIG. 6 corresponds to a linear detection scheme, and the transmission sub-routine depicted in FIG. 7 corresponds to a non-linear detection scheme.

Figure 6:
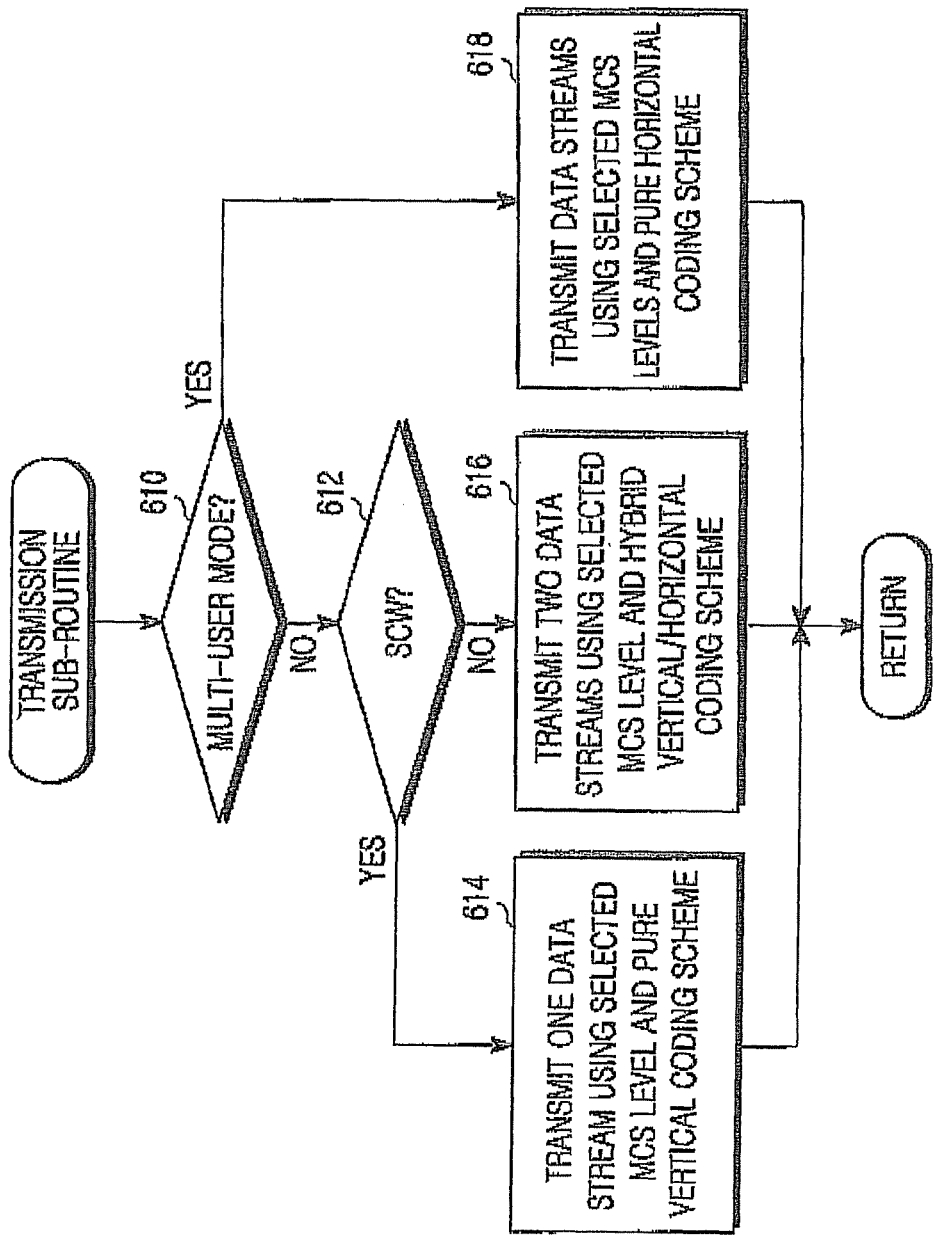
FIGS. 6 and 7 are flowcharts illustrating a control operation for the transmission sub-routine illustrated in FIG. 4.

Referring to FIG. 6, in the transmission of the data stream, the transmitter first determines whether the operation mode is the multi-user mode or the single-user mode in operation 610. In the case of the multi-user mode, the transmitter selects MCS levels for respective users selected for the multi-user mode and selects a pure horizontal coding scheme in operation 618. Thus, the transmitter transmits the data stream to each of the selected user according to the MCS level selected for the data stream and the pure horizontal coding scheme.

In the case of the single-user mode, the transmitter determines whether a single data stream (i.e. a Single CodeWord (SCW)) will be transmitted to the selected user in operation 612. In the case of the SCW, the transmitter selects an MCS level for the selected user according to $CQI_{effective}$ computed by $Rate(CQI_{max,k})+(N_{stream}-1)\times Rate(CQI_{remaining,k})$ and selects a pure vertical coding scheme in operation 614. Therefore, the two AMCs (216 and 220 in FIG. 2) in the signal transmitter are notified of the selected MCS level and coding scheme. Each AMC transmits a received data stream using the MCS level and the coding scheme.

In the case of a Multi-CodeWord (MCW) in operation 612, the transmitter selects MCS levels for the selected user and selects a hybrid vertical/horizontal coding scheme in operation 616. The MCS levels are separately determined for the two AMCs. First and second MCS levels are determined according to $CQI_{max}$ and $CQI_{remaining}$, respectively. Thus, one of the two AMCs transmits a received data stream using the first MCS level and the hybrid vertical/horizontal coding scheme, and the other AMC transmits received multiple data streams using the second MCS level and the hybrid vertical/horizontal coding scheme.

Figure 7:
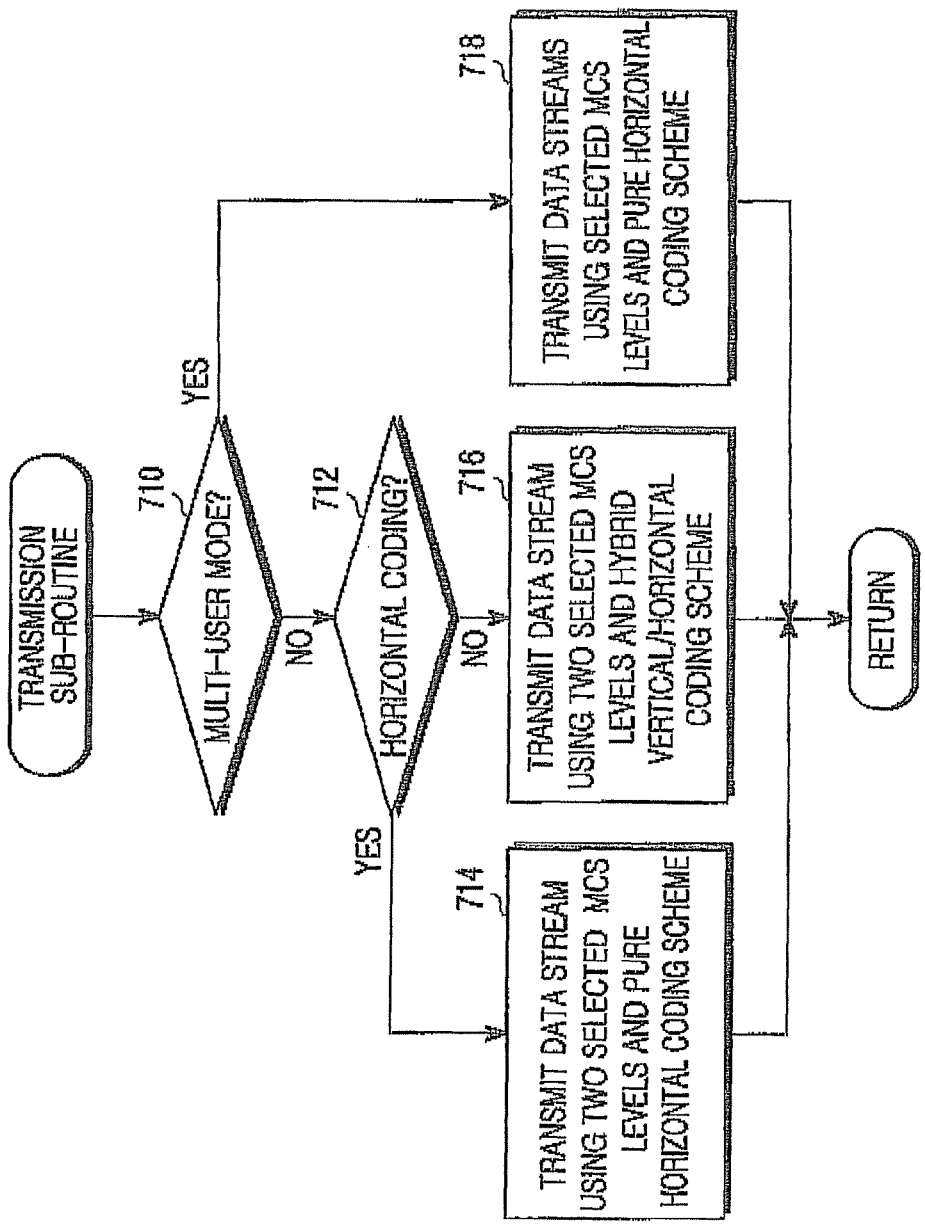

Referring to FIG. 7, in the transmission of the data stream, the transmitter first determines whether the operation mode is the multi-user mode or the single-user mode in operation 710. In the case of the multi-user mode, the transmitter selects MCS levels for respective users selected for the multi-user mode and selects the pure horizontal coding scheme in operation 718. Thus, the transmitter transmits the data stream to each of the selected users according to the MCS level selected for the data stream and the pure horizontal coding scheme.

In the case of the single-user mode, the transmitter determines whether the receiver requests the pure horizontal coding scheme by checking a coding scheme ID included in the feedback information received from the selected user in operation 712.

In the case of the pure horizontal coding scheme, the transmitter selects a first MCS level based on $CQI_{max}$ and a second MCS level based on $CQI_{effective}$ and selects the pure vertical coding scheme in step 714. $CQI_{effective}$ is computed by $Rate(CQI_{max,k})+(N_{stream}-1)\times Rate(CQI_{remaining,k})$. Therefore, a first AMC in the transmitter is notified of the first MCS level and the pure vertical coding scheme, and a second AMC is notified of the second MCS level and the pure vertical coding scheme. Each AMC transmits a received data stream using the first or second MCS level and the pure vertical coding scheme.

In the case of the hybrid vertical/horizontal coding scheme in operation 712, the transmitter selects the first MCS level based on $CQI_{max}$ and the second MCS level based on $CQI_{effective}$ and selects the hybrid vertical/horizontal coding scheme in operation 716. $CQI_{effective}$ is computed by $Rate(CQI_{max,k})+(N_{stream}-1)\times Rate(CQI_{remaining,k})$. Accordingly, a first AMC is notified of the first MCS level and the hybrid vertical/horizontal coding scheme and a second AMC is notified of the second MCS level and the hybrid vertical/horizontal coding scheme. Each AMC transmits a received data stream using the first or second MCS level and the hybrid vertical/horizontal coding scheme.

Referring back to FIG. 4, after the transmission of the data stream (or streams), the transmitter ends the transmission operation according to the embodiment of the present invention.

Aspects of the present invention can apply antenna grouping to the aforementioned embodiments of the present invention. In accordance with an antenna grouping technique, a plurality of antennas is grouped into a predetermined number of groups, and the CQI of each antenna group is reported. Thus, data transmission is carried out by processing the CQIs of the respective antenna groups. For example, if four transmit antennas are used, first and second transmit antennas are grouped into a first antenna group and third and fourth transmit antennas are grouped into a second antenna group.

The receiver estimates CQIs on each antenna group. For four transmit antennas, the CQIs of the first and second antenna groups are computed by:

$$f_r(\rho_{g,1}) = \sum_{m=1}^{2} f_r(\rho_m),$$

$$f_r(\rho_{g,2}) = \sum_{m=3}^{4} f_r(\rho_m)$$

Equation (9)

where $\rho_m$ is the CQI of an $m^{th}$ transmit antenna, $f_r(\rho)=\log_2(1+\Gamma\rho)$ in which $\Gamma$ is the performance gap between an actual performance and the Shannon capacity.

If the receiver uses a linear detection scheme, $\rho_m$ is given as:

$$\rho_m = h_m^H \left( \sum_{l \neq m} h_m h_m^H + \frac{4}{SNR} I \right) h_m \qquad \text{Equation (10)}$$

Then the receiver forms feedback information with the CQIs of the antenna groups. The feedback information is given as:

$$\{\rho_{g,max}, I_{g,max}, \rho_{g,min}^{SIC}\} \qquad \text{Equation (11)}$$

where $\rho_{g,max}=\max\{\rho_{g,1},\rho_{g,2}\}$ is the maximum of the CQIs of the antenna groups, $I_{g,max}$ is the index of an antenna group with the maximum CQI, and $\rho_{g,min}^{SIC}$ is a post-SIC CQI corresponding to an antenna group with $I_{g,min}=\arg\min\{\rho_{g,1},\rho_{g,2}\}$. That is, $\rho_{g,min}^{SIC}=\rho_{g,1_{g,min}}^{SIC}$ in which $$f_r(\rho_{g,1}^{SIC}) = \sum_{m=1}^{2} f_r(\rho_m^{SIC}) \text{ and } f_r(\rho_{g,2}^{SIC}) = \sum_{m=3}^{4} f_r(\rho_m^{SIC}).$$

Here, $\rho_m^{SIC}$ is the CQI of the $m^{th}$ antenna after canceling transmitted signals belonging to the other antenna groups by SIC processing.

The receiver reports the feedback information $\{\rho_{g,max}, I_{g,max}, \rho_{g,min}^{SIC}\}$ to the transmitter. The transmitter collects feedback information from all of the receivers. $\rho_{g,max}$ and $I_{g,max}$ are used for one CQI-multi-user scheduling.

The transmitter acquires the maximum sum performance of a multi-user multi-antenna system with one-CQI multi-user scheduling, $R_{MU,1}$ which is less than or equal to $R_{MU}$ ($R_{MU,1} \leq R_{MU}$). $R_{MU}$ is the maximum sum of a multi-user multi-antenna system with 4-CQI multi-user scheduling.

Then the transmitter calculates a maximum single-user mode performance $R_{SU}$. Assuming that the total number of active receivers (i.e. MSs) in a sector is K, $R_{SU}$ is computed by:

$$R_{SU} = \max_{k=1,2,\ldots,K} \{f_r(\rho_{g,max}(k)) + f_r(\rho_{g,min}^{SIC}(k))\} \qquad \text{Equation (12)}$$

Similar to the operation mode selection method described with reference to FIG. 5, the transmitter compares $R_{MU,1}$ with $R_{SU}$. If $R_{MU,1}$ is equal to or larger than $R_{SU}$, the transmitter selects the multi-user mode. Otherwise, the transmitter selects the single-user mode.

Figure 8:
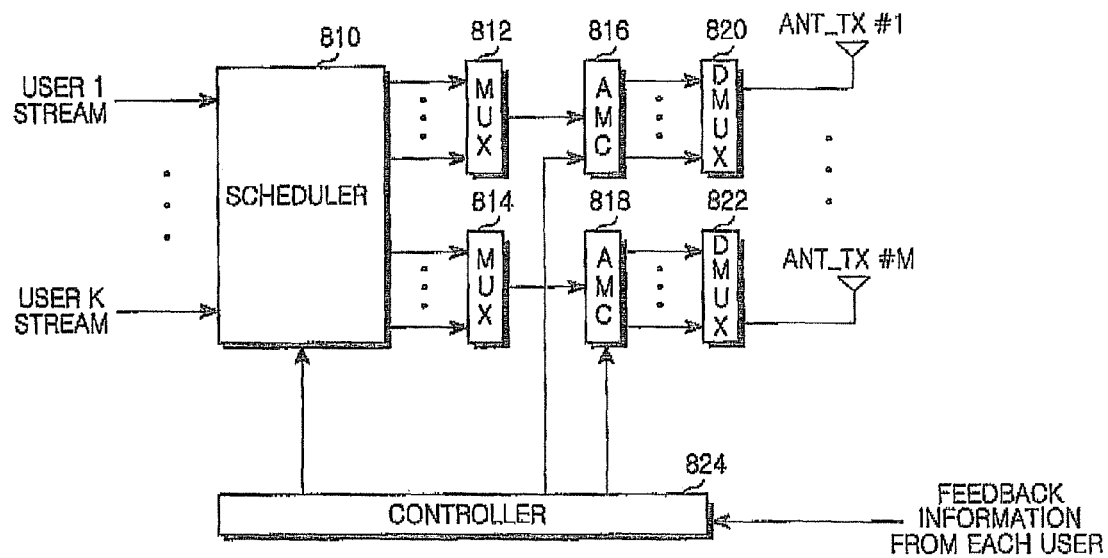
FIG. 8 is a block diagram of a transmitter according to another embodiment of the present invention.

FIG. 8 is a block diagram of a transmitter according to another embodiment of the present invention. Specifically, FIG. 8 is a block diagram of a transmitter in a system in which antenna grouping, as described above, is applied.

Referring to FIG. 8, data streams for K number of users are provided to a scheduler 810. The scheduler 810 groups the data streams into a plurality of groups under the control of a controller 824. Two groups will be described as an example in the present disclosure. However, it is understood that aspects of the present invention are not limited thereto.

First and second data stream groups are provided respectively to first and second MUXes 812 and 814. Each of the first and second MUXes 812 and 814 multiplexes the data streams of the received data stream group into a single data stream.

A first AMC 816 encodes and modulates the data stream received from the first MUX 812 according to an MCS level indicated by the controller 824. Similarly, a second AMC 818 encodes and modulates the data stream received from the second MUX 814 according to an MCS level indicated by the controller 824.

A first DEMUX 820 demultiplexes the data stream received from the first AMC 816 into a plurality of data streams and transmits the plurality of data streams through corresponding transmit antennas. A second DEMUX 822 demultiplexes the data stream received from the second AMC 818 into a plurality of data streams and transmits the plurality of data streams through corresponding transmit antennas.

The controller 824 controls the scheduler 810, the first AMC 816, and the second AMC 818 based on feedback information received from the receivers.

As is apparent from the above description, aspects of the present invention provide a method for reducing the amount of feedback information required for resource allocation in a closed-loop multi-antenna system. Therefore, resources can be allocated with minimal feedback information. Also, according to aspects of the present invention, a communication service can be provided adaptively because a communication scheme to be supported is decided based on the feedback information when the closed-loop multi-antenna system supports diverse communication schemes.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of a receiver in a closed-loop multi-antenna system, the method comprising:
   acquiring Channel Quality Information (CQIs) from data streams of a received signal;
   selecting the best CQI having the highest value from among the acquired CQIs;
   selecting a signal detection scheme from a plurality of signal detection schemes based on a status of a channel corresponding to the data streams;
   calculating an average CQI of remaining acquired CQIs except for the best CQI among the acquired CQIs;

generating feedback information based on the signal detection scheme selected by the receiver, the feedback information comprising the best CQI, the average CQI, and an identifier of a data stream with the best CQI; and transmitting the feedback information to a transmitter, wherein the average CQI is calculated differently based on the signal detection scheme used to generate the feedback information.

2. The method as claimed in claim 1, wherein the acquiring of the CQIs from the data streams comprises:
acquiring the CQIs from the data streams by channel estimation of the received signal.

3. The method as claimed in claim 1, wherein the identifier of the data stream with the best CQI is an index of the data stream with the best CQI.

4. The method as claimed in claim 1, wherein the calculating of the average CQI comprises:
selecting a first CQI that corresponds to a CQI that has a lowest value from among the acquired CQIs, if the signal detection scheme is Successive Interference Cancellation (SIC); and
selecting a CQI having a maximum value between the first CQI and the average CQI as a common CQI.

5. The method as claimed in claim 1, wherein the feedback information further comprises a coding scheme identifier (ID) according to a CQI acquisition method.

6. The method as claimed in claim 5, wherein the coding scheme ID is determined according to whether the CQIs are acquired by Successive Interference Cancellation (SIC).

7. The method as claimed in claim 6, wherein the coding scheme ID indicates one of a pure horizontal coding scheme and a hybrid vertical/horizontal coding scheme.

8. The method as claimed in claim 1, wherein the generating of the feedback information comprises:
selecting an optimal precoding matrix from among precoding matrices of a codebook according to the acquired CQIs; and
generating the feedback information comprising the at least one CQI, the average CQI, the identifier of the data stream with the best CQI, and an index of the optimal precoding matrix.

9. The method as claimed in claim 7, wherein the generating of the feedback information comprises:
selecting an optimal precoding matrix from among precoding matrices of a codebook according to the acquired CQIs; and
generating the feedback information comprising the best CQI, the average CQI, the identifier of the data stream with the best CQI, and an index of the optimal precoding matrix.

10. An apparatus for receiving data in a closed-loop multi-antenna system, the apparatus comprising:
a channel estimator to acquire Channel Quality Information (CQIs) from data streams of a received signal and to select a signal detection scheme from among a plurality of signal detection schemes based on a status of a channel corresponding to the data streams; and
a feedback information generator to select the best CQI having the highest value among the acquired CQIs, to calculate an average CQI of remaining acquired CQIs except for the best CQI among the acquired CQIs to generate feedback information based on the signal detection scheme selected by the channel estimator, the feedback information comprising the best CQI, the average CQI, and an identifier of a data stream with the best CQI, and to transmit the feedback information to a transmitter, wherein the average CQI is calculated differently based on the signal detection scheme used to generate the feedback information.

11. The apparatus as claimed in claim 10, wherein the channel estimator acquires the CQIs from the data streams by channel estimation of the received signal.

12. The apparatus as claimed in claim 10, wherein the identifier of the data stream with the best CQI is an index of the data stream with the best CQI.

13. The apparatus as claimed in claim 10, wherein the feedback information generator calculates the common CQI by selecting a first CQI that corresponds to a CQI that has a lowest value from among the acquired CQIs, if the signal detection scheme is Successive Interference Cancellation (SIC), and selecting a CQI having a maximum value between the first CQI and the average CQI as the common CQI.

14. The apparatus as claimed in claim 10, wherein the feedback information further comprises a coding scheme identifier (ID) according to a CQI acquisition method.

15. The apparatus as claimed in claim 14, wherein the feedback information generator determines the coding scheme ID according to whether the CQIs are acquired by Successive Interference Cancellation (SIC).

16. The apparatus as claimed in claim 15, wherein the coding scheme ID indicates one of a pure horizontal coding scheme and a hybrid vertical/horizontal coding scheme.

17. The apparatus as claimed in claim 10, wherein the feedback information generator selects an optimal precoding matrix from among precoding matrices of a codebook according to the acquired CQIs, and generates the feedback information to further comprise an index of the optimal precoding matrix.

18. The apparatus as claimed in claim 16, wherein the feedback information generator selects an optimal precoding matrix from among precoding matrices of a codebook according to the acquired CQIs, and generates the feedback information to further comprise an index of the optimal precoding matrix.

19. A method of transmitter in a closed-loop multi-antenna system, the method comprising:
receiving feedback information from at least one receiver, the feedback information comprising a best Channel Quality Information (CQI) that corresponds to a CQI that has a highest value from among a plurality of CQIs acquired by the at least one receiver, an average CQI, an identifier of the data stream with the best CQI, and information indicating a signal detection scheme selected by the receiver from among a plurality of signal detection schemes;
processing the feedback information and determining an operation mode according to the processed feedback information; and
transmitting one or more data streams in the determined operation mode, wherein:
the feedback information is processed differently based on the signal detection scheme used by the at least one receiver to generate the feedback information, and
the average CQI is calculated as an average of remaining acquired CQIs except for the best CQI among the acquired CQIs.

20. The method as claimed in claim 19, wherein the operation mode is one of a single-user mode and a multi-user mode, the single-user mode transmits one or more data streams to one user through a plurality of transmit antennas, and the multi-user mode transmits one or more data streams to at least two users through the plurality of transmit antennas.

21. The method as claimed in claim 20 wherein the determining of the operation mode comprises:
  calculating a maximum sum data rate of the multi-user mode $R_{MU,sum}$ and calculating a data rate of the single-user mode $R_{SU}$;
  selecting the multi-user mode as the operation mode if the $R_{MU,sum}$ is greater than the $R_{SU}$; and
  selecting the single-user mode as the operation mode if the $R_{MU,sum}$ is equal to or less than the $R_{SU}$.

22. The method as claimed in claim 21, wherein the calculating of the $R_{SU}$ comprises:
  calculating the data rate of the single-user mode $R_{SU}$ and an optimal user with the $R_{SU}$ by:

$$R_{SU} = \max_{k=1,2,\ldots,K} \{\text{Rate}(CQI_{max,k}) + (N_{stream} - 1) \times \text{Rate}(CQI_{remaining,k})\}$$

where $\text{Rate}(CQI_{max,k})$ is a data rate supported by the best CQI received from a $k^{th}$ user, $\text{Rate}(CQI_{remaining,k})$ is the data rate supported by a common CQI received from the $k^{th}$ user, and $N_{stream}$ is a total number of transmitted data streams.

23. The method as claimed in claim 22, wherein the transmitting of the one or more data streams comprises:
  in response to the operation mode being the single-user mode, selecting a Modulation and Coding Scheme (MCS) level supported by a data rate and transmitting one data stream to the optimal user using the selected MCS level, the data rate computed by:

$$\text{Rate}(CQI_{max,k}) + (N_{stream}-1) \times \text{Rate}(CQI_{remaining,k}).$$

24. The method as claimed in claim 23, wherein the transmitting of the one data stream further comprises:
  encoding the one data stream with a pure vertical coding scheme.

25. The method as claimed in claim 22, wherein the transmitting of the one or more data streams comprises:
  in response to the operation mode being the single-user mode, selecting a first MCS level based on the best CQI and selecting a second MCS level based on the average CQI.

26. The method as claimed in claim 25, wherein the transmitting of the one or more data streams further comprises:
  transmitting a first data stream to the optimal user using the first MCS level and transmitting a second data stream to the optimal user using the second MCS level.

27. The method as claimed in claim 26, wherein the transmitting of the one or more data streams further comprises:
  encoding the first data stream and the second data stream with a hybrid vertical/horizontal coding scheme.

28. An apparatus for transmitting data in a closed-loop multi-antenna system, the apparatus comprising:
  a controller to receive feedback information from at least one receiver, the feedback information comprising a best Channel Quality Information (CQI) that corresponds to a CQI that has a highest value from among a plurality of CQIs acquired by the at least one receiver, an average CQI, an identifier of the data stream with the best CQI, and information indicating a signal detection scheme selected by the receiver from among a plurality of signal detection schemes, and to process the feedback information and to determine an operation mode according to the processed feedback information; and
  a signal transmitter to transmit one or more data streams in the determined operation mode, wherein:
    the feedback information is processed differently based on the signal detection scheme used by the at least one receiver to generate the feedback information, and
    the average CQI is calculated as an average of remaining acquired CQIs except for the best CQI among the acquired CQIs.

29. The apparatus as claimed in claim 28, wherein the operation mode is one of a single-user mode and a multi-user mode, the single-user mode transmits the one or more data streams to one user through a plurality of transmit antennas, and the multi-user mode transmits the one or more data streams to at least two users through the plurality of transmit antennas.

30. The apparatus as claimed in claim 29, wherein the controller calculates a maximum sum data rate of the multi-user mode $R_{MU,sum}$ and calculates a data rate of the single-user mode selects the multi-user mode as the operation mode if the $R_{MU,sum}$ is greater than the $R_{SU}$, and selects the single-user mode as the operation mode if the $R_{MU,sum}$ is equal to or less than the $R_{SU}$.

31. The apparatus as claimed in claim 30, wherein the controller calculates the data rate of the single-user mode $R_{SU}$ and an optimal user with the $R_{SU}$ by:

$$R_{SU} = \max_{k=1,2,\ldots,K} \{\text{Rate}(CQI_{max,k}) + (N_{stream} - 1) \times \text{Rate}(CQI_{remaining,k})\}$$

where $\text{Rate}(CQI_{max,k})$ is a data rate supported by the best CQI received from a $k^{th}$ user, $\text{Rate}(CQI_{remaining,k})$ is a data rate supported by the common CQI received from the $k^{th}$ user, and $N_{stream}$ is a total number of transmitted data streams.

32. The apparatus as claimed in claim 31, wherein if the operation mode is the single-user mode, the controller selects a Modulation and Coding Scheme (MCS) level supporting a data rate computed by:

$$\text{Rate}(CQI_{max,k}) + (N_{stream}-1) \times \text{Rate}(CQI_{remaining,k}).$$

33. The apparatus as claimed in claim 32, wherein the signal transmitter transmits one data stream to the optimal user using the selected MCS level.

34. The apparatus as claimed in claim 33, wherein the signal transmitter encodes the one data stream with a pure vertical coding scheme.

35. The apparatus as claimed in claim 31, wherein in response to the operation mode being the single-user mode, the controller selects a first MCS level based on the best CQI and selects a second MCS level based on the average CQI.

36. The apparatus as claimed in claim 35, wherein the signal transmitter transmits a first data stream to the optimal user using the first MCS level and transmits a second data stream to the optimal user using the second MCS level.

37. The apparatus as claimed in claim 36, wherein the signal transmitter encodes the first data stream and the second data stream with a hybrid vertical/horizontal coding scheme.

38. The apparatus as claimed in claim 28, wherein the apparatus is a base station in the closed-loop multi-antenna system.

39. The method as claimed in claim 19, wherein the calculating of the average CQI comprises:
  selecting a first CQI that corresponds to a CQI that has the lowest value from among the acquired CQIs, if the signal detection scheme is Successive Interference Cancellation (SIC); and
  selecting a CQI having the maximum value between the first CQI and the average CQI as a common CQI.

40. The apparatus as claimed in claim 28, wherein the calculating of the average CQI comprises:

selecting a first CQI that corresponds to a CQI that has the lowest value from among the acquired CQIs, if the signal detection scheme is Successive Interference Cancellation (SIC); and selecting a CQI having the maximum value between the first CQI and the average CQI as a common CQI.

* * * * *